United States Patent
Tsuchiya et al.

(10) Patent No.: US 8,142,323 B2
(45) Date of Patent: Mar. 27, 2012

(54) CONTINUOUSLY VARIABLE TRANSMISSION

(75) Inventors: Saoto Tsuchiya, Tokyo (JP); Masahiro Hasebe, Tokyo (JP); Norihiro Kai, Aichi-ken (JP); Alan Fielding, Lancashire (GB)

(73) Assignees: Torotrak (Development) Limited, Leyland, Lancashire (GB); KK Equos Research, Tokyo (JP)

( * ) Notice: Subject to any disclaimer, the term of this patent is extended or adjusted under 35 U.S.C. 154(b) by 886 days.

(21) Appl. No.: 11/910,450

(22) PCT Filed: Mar. 31, 2006

(86) PCT No.: PCT/EP2006/061254
§ 371 (c)(1),
(2), (4) Date: May 23, 2008

(87) PCT Pub. No.: WO2006/103294
PCT Pub. Date: Oct. 5, 2006

(65) Prior Publication Data
US 2009/0048054 A1   Feb. 19, 2009

(30) Foreign Application Priority Data
Mar. 31, 2005 (JP) .................... 2005-104319

(51) Int. Cl.
*F16H 37/02* (2006.01)
(52) U.S. Cl. .................... 475/216; 475/217; 475/219
(58) Field of Classification Search ........... 475/207, 475/214–219
See application file for complete search history.

(56) References Cited

U.S. PATENT DOCUMENTS

| | | | |
|---|---|---|---|
| 5,607,372 A | 3/1997 | Lohr | |
| 6,059,685 A | 5/2000 | Hoge et al. | |
| 6,585,619 B2 * | 7/2003 | Henzler | 475/214 |
| 6,705,964 B2 * | 3/2004 | Nagai et al. | 475/216 |
| 6,719,659 B2 * | 4/2004 | Geiberger et al. | 475/216 |
| 6,726,590 B2 * | 4/2004 | Henzler et al. | 475/216 |
| 6,949,045 B2 * | 9/2005 | Wafzig et al. | 475/216 |
| 2002/0019285 A1 | 2/2002 | Henzler | |
| 2002/0045511 A1 | 4/2002 | Geiberger et al. | |
| 2004/0157694 A1 | 8/2004 | Elser et al. | |

FOREIGN PATENT DOCUMENTS

| | | |
|---|---|---|
| DE | 100 39 779 A1 | 2/2002 |
| EP | 1 026 424 A2 | 8/2000 |
| WO | WO 03/064892 A1 | 8/2003 |
| WO | WO 03/100295 A1 | 12/2003 |
| WO | WO 2006/032870 A1 | 3/2006 |

* cited by examiner

*Primary Examiner* — David D Le
*Assistant Examiner* — Huan Le
(74) *Attorney, Agent, or Firm* — Blakely, Sokoloff, Taylor & Zafman LLP.

(57) ABSTRACT

In a continuously variable transmission ("CVT") using a toroidal-race continuously variable ratio device and a planetary gear mechanism, the rotation of the input shaft (12) is directly transmitted to the carrier C of the planetary gear mechanism ($6_1$), and rotation resulting from gearing and reversal by the variator (5) is transmitted to the sun gear (S1). When the low clutch L is engaged, the rotation of the ring gear (R3) is transmitted via the reversing gear mechanism ($7_1$) to the output shaft (13), and when the high clutch H is engaged, the rotation of the sun gear (S2) is transmitted to the output shaft (13).

5 Claims, 9 Drawing Sheets

FIG.6a Brake Type

FIG.6b Clutch Type

CONTINUOUSLY VARIABLE TRANSMISSION

CROSS-REFERENCE TO OTHER APPLICATIONS

This is a National Phase of International Application No. PCT/EP2006/061254, filed on Mar. 31, 2006, which claims priority from Japanese Patent Application No. 2005-104319, filed on Mar. 31, 2005.

BACKGROUND OF THE INVENTION

The present invention relates to a continuously variable transmission which incorporates a continuously variable ratio device ("variator") and is able to produce a range of output gearing ratios wider than the range provided by the variator using a planetary gear mechanism and employing power recirculation. More specifically, it relates to a continuously variable transmission in which the input shaft and the output shaft are coaxially disposed.

Figure 6A:
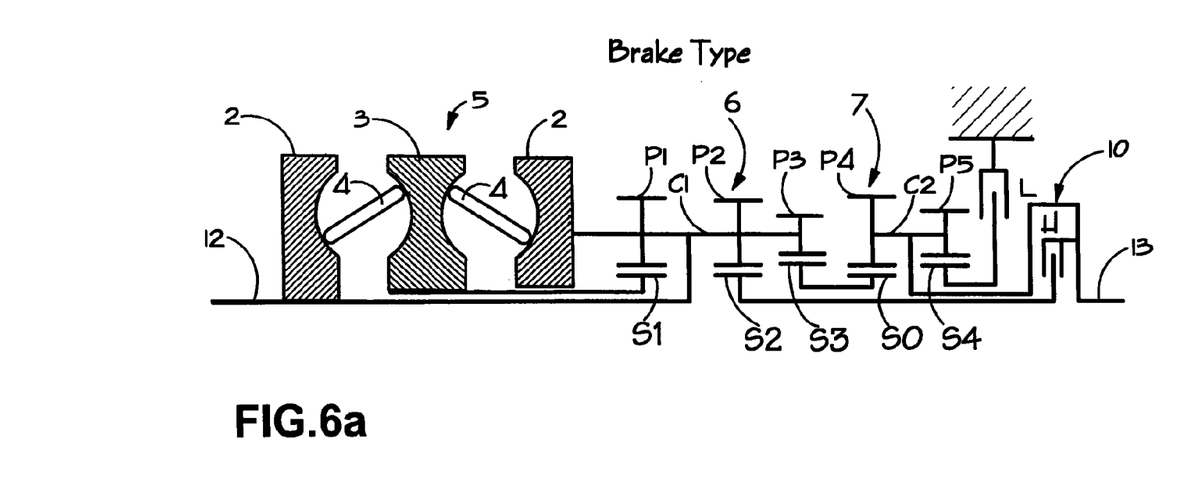
FIG. 6 is a schematic diagram showing prior art, in which (a) and (b) show partly different types.

A continuously variable transmission has already been proposed which uses a toroidal type of variator and in which various parts are disposed coaxially (see WO 03/100295 A1). As shown in FIG. 6 (a), the said continuously variable transmission 1 incorporates: a toroidal race, rolling traction variator 5 comprising an input disc 2, an output disc 3 and rollers 4 which are disposed between these two discs and which are able to alter their position of radial contact with the two discs; a planetary gear mechanism 6 having a carrier C1 supporting three pinions P1, P2 and P3 mutually spaced along the axial direction; a reversing gear mechanism 7 having a cattier C2 supporting two pinions P4 and P5 which are spaced along the axial direction; and a high/low regime change mechanism 10 comprising a low brake L able to stop a sun gear S4 on the output side of the reversing gear mechanism, and a high clutch H interposed between a second sun gear (high-mode output gear) S2 of the planetary gear and an output shaft 13. These members are arranged coaxially between the input shaft 12 and the output shaft 13.

Thus, in a low regime, in which the low brake L is engaged and the high clutch H is disengaged, the known continuously variable transmission 1 uses the planetary gear mechanism 6 to combine the rotations of the carrier C1 (directly inputting the rotation of the input shaft 12) and the sun gear S1 on the input side, which has been reversed and geared via the directly inputting carrier CT and variator 5, and outputs the result to a low-mode output gear (third sun gear) S3. The planetary gear mechanism 6 also reverses the rotation of the said output gear S3 and outputs the result to the output shaft 13.

Figure 6B:
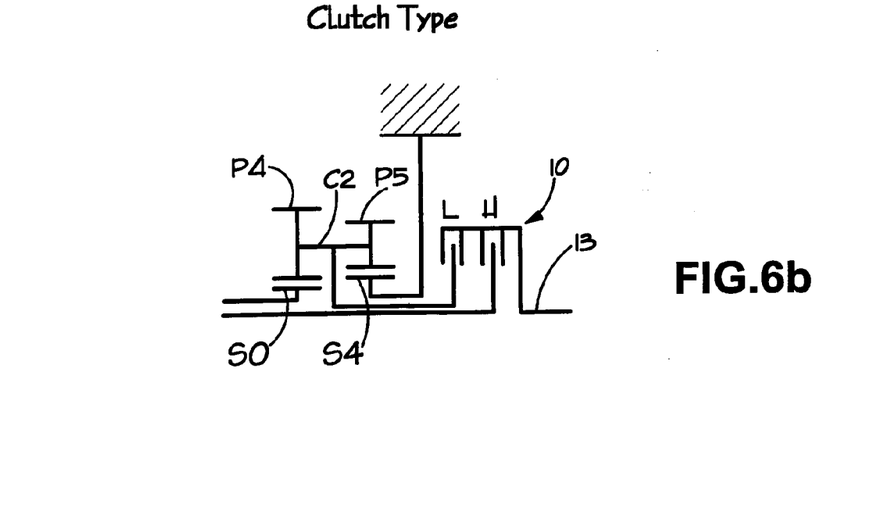

It will be appreciated that, as shown in FIG. 6 (b), the low/high regime change mechanism 10 may also be configured using a low clutch L interposed between a carrier C2 and the output shaft 13, and a high clutch H similar to the one above interposed between the second sun gear S2 of the planetary gear and the output shaft 13.

The known continuously variable transmission has large axial length since the planetary gear mechanism 6 comprises three pinions P1, P2 and P3 which are separated along the axial direction, and the reversing gear mechanism 7 also comprises two pinions P4 and P5 which are separated along the axial direction.

SUMMARY OF THE INVENTION

The inventors of the present patent application have devised a continuously variable transmission which uses a dual planetary gear in the reversing gear mechanism and allows for shortening in the axial direction.

In accordance with the first aspect of the present invention, there is a continuously variable transmission ("CVT") comprising a toroidal-race continuously variable ratio device ("variator"), a planetary gear mechanism, a reversing gear mechanism, and a low/high regime change mechanism, the variator having a rotary input and a rotary output, the rotary input of the variator being drivably coupled to an input shaft of the CVT, characterised in that:

the planetary gear mechanism comprises two trains of planetary gears and has four external coupling elements, namely a first element, a second element, a third element and a fourth element;

the first element is drivably coupled to the input shaft so that its rotation is determined by that of the input shaft, and the second element is drivably coupled to the rotary output of the variator so that its rotation is determined by the variator's output speed and results from a reversal of the rotational direction of the input shaft of the CVT and a continuously variable speed change produced by the variator;

in a low regime mediated by the low/high regime change mechanism, the third element is drivingly coupled to an output shaft of the CVT, the rotation of the third element being reversed by means of the reversing gear mechanism, and in a high regime mediated by the low/high regime change mechanism, the fourth element is drivingly coupled to the output shaft of the CVT.

Since the planetary gear mechanism comprises a 2-train/4-element type of planetary gear, the pinion shaft need only have a short arrangement for supporting two trains of pinions in the axial direction, and, as a result, the bearing which supports the two trains of pinions in a freely rotatable fashion can also have a large diameter and the life capacity of the bearing can be improved, in addition to which flexing of the pinion shaft can be reduced thereby reducing accompanying load fluctuation on the bearing, and the pinion weight also becomes lighter, so that centrifugal loading is reduced, and these together can improve the precision of support of the pinions and can maintain this high precision over a long period of time.

Also, because the system comprises a two-train planetary gear, the continuously variable transmission can be compactly arranged by shortening the planetary gear mechanism in the axial direction.

Preferably, the planetary gear mechanism is of Ravigneaux type, which has proved of practical worth as a 2-train/4-element type of mechanism. It follows that it can be shortened in the axial direction and thus the continuously variable transmission can be compactly arranged and its reliability improved.

In accordance with a second aspect of the present invention, there is a continuously variable transmission ("CVT") comprising a toroidal-race continuously variable ratio device ("variator"), a planetary gear mechanism, a reversing gear mechanism, and a low/high regime change mechanism, characterised in that:

the planetary gear mechanism has a carrier having a first pinion shaft and a second pinion shaft, a first sun gear, a second sun gear, and a ring gear, the first pinion shaft supports a first pinion and a second pinion which rotate together, the second pinion shaft supports a third pinion, and the first pinion or the second pinion meshes with the third pinion, the first pinion and the first sun gear mesh, the second pinion and the second sun gear mesh, and the third pinion and the ring gear mesh, the carrier receives rotational input from an input shaft, and the first sun gear receives the variator's output rotation, which results from reversal and speed change of the rotation of the input shaft produced by the variator;

in a low regime mediated by the low/high regime change mechanism, the rotation of the ring gear is output to an output shaft after being reversed by means of the reversing gear mechanism; and in a high regime mediated by the low/high regime change mechanism, the rotation of the second sun gear is output to the output shaft.

Because the planetary gear mechanism comprises what is known as a Ravigneaux type of planetary gear, and because the first planetary shaft need only have a short arrangement supporting the first pinion and the second pinion, and because the ring gear constitutes a low-regime output gear, it follows that there is little effect on the second pinion shaft, designed to give a gear ratio for achieving the function of continuously variable transmission (CVT) accompanied by power recirculation employing gear shifting in both the underdrive and overdrive directions of the variator, and that a second pinion shaft having a relatively large diameter can be employed.

As a result, the bearing which supports the first and second pinions in a freely rotatable fashion can also have a large diameter and the bearing life capacity is improved and, by using a second pinion shaft which is highly rigid and a short and stout arrangement, flexing of the said shaft is reduced thereby reducing accompanying load fluctuation on the bearing, in addition to which the pinion weight also becomes lighter and the centrifugal loading is reduced, and these together can improve the prevision of support of the pinions and can maintain this high precision over a long period of time.

Again, because the ring gear which constitutes the output gear in the low regime and the second sun gear which constitutes the output gear in the high regime can overlap in the axial direction, it follows that the transmission can be compactly arranged by shortening the planetary gear mechanism in the axial direction.

Further, compact and uncomplicated coupling can be achieved by coupling the input shaft and the input disc of the variator to a carrier, and coupling the output disc of the variator to a first sun gear, thereby configuring the central part of the variator from a double shaft.

Preferably, the reversing gear mechanism comprises a dual planetary gear having a carrier supporting a first and a second pinion which mesh with each other, a sun gear which meshes with the first pinion, and a ring gear which meshes with the abovementioned second pinion, and the ring gear of the planetary gear mechanism is coupled to one or other of the carrier and sun gear of the reversing gear mechanism, and, in the low regime, with the ring gear stopped, one of the carrier and the sun gear transmits the rotation of the other to the output shaft.

Because the reversing gear mechanism comprises a dual planetary gear, it follows that the said reversing gear mechanism can be shortened in the axial direction thereby rendering the transmission even more compact and, in particular, shortening it in the axial direction.

Preferably the variator has two input discs, an output disc or a back-to-back pair of output discs positioned between the input discs, and rollers sandwiched between the input discs and output discs, and the two input discs, the input shaft and the carrier of the abovementioned planetary gear mechanism are arranged to collectively sustain thrust forces, and the first and second sun gears are also supported in the thrust direction via thrust bearings, with respect to the integrally arranged carrier or input shaft It follows that the thrust force is supported with both the variator and the planetary gear mechanism acting as a single system, and high-precision support can be maintained over a long time and the life of the variator can be extended, without the application of any substantial thrust loading on elements such as the casing and the thrust bearing for the casing.

BRIEF DESCRIPTION OF THE DRAWINGS

Specific embodiments of the present invention will now be described, by way of example only, with reference to the accompanying drawings, in which.

DETAILED DESCRIPTION OF THE INVENTION

Figure 7:
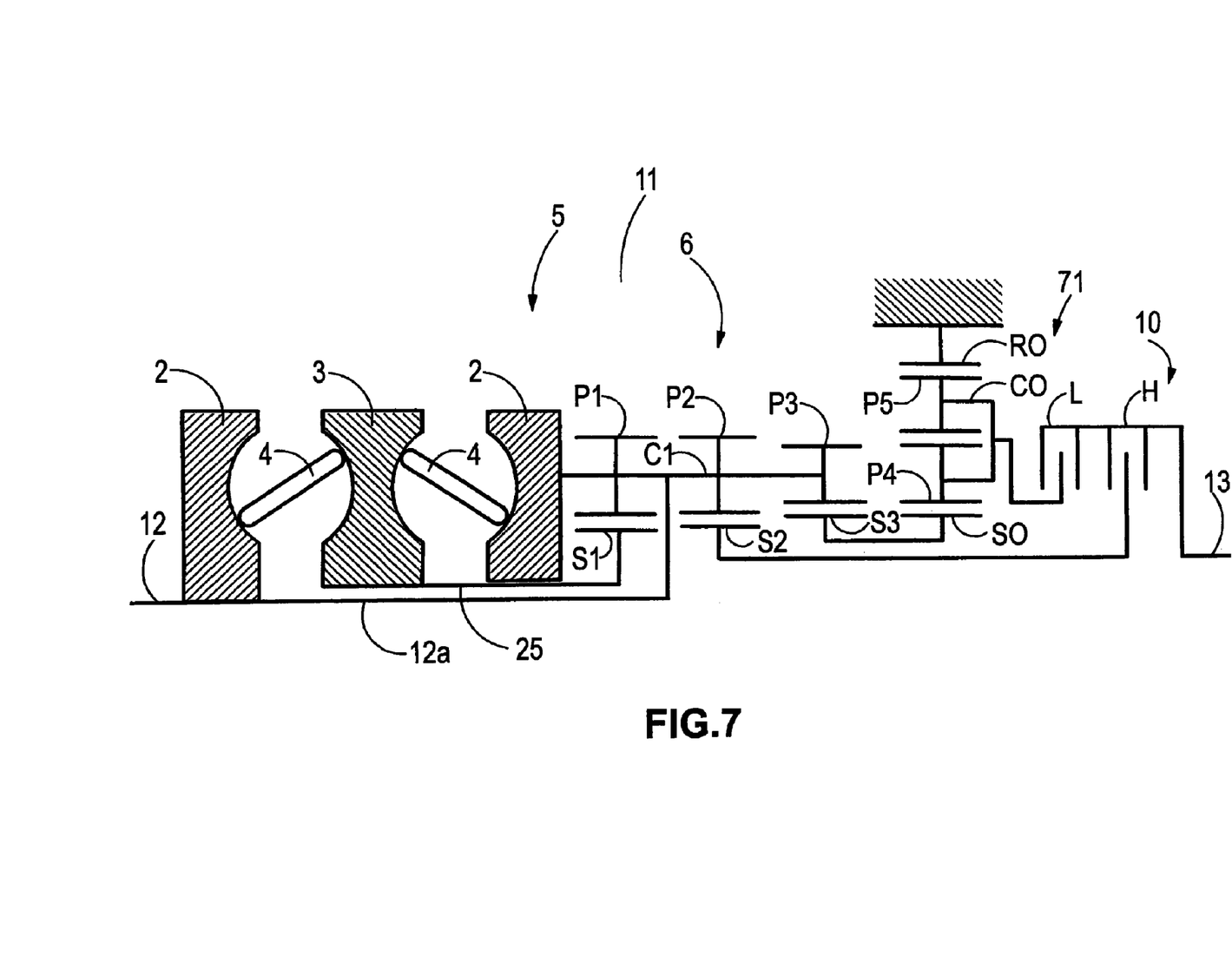
FIG. 7 is a schematic diagram showing technology constituting background to the present invention which the present inventors devised based on the abovementioned prior art.

In the continuously variable transmission 11, illustrated in FIG. 7, the toroidal type variator 5 and the planetary gear mechanism 6 are the same as described above, but the reversing gear mechanism $7_1$ comprises a dual planetary gear. This is to say, the carrier C0 supports the pinions P4 and P5, which mesh with each other, in a freely rotatable fashion, and one of the pinions P4 meshes with the sun gear S0 while the other pinion P5 meshes with the ring gear R0, in addition to which the sun gear S0 is coupled with a third sun gear (low-mode output gear) S3 of the abovementioned planetary gear mechanism 6, the ring gear R0 is fixed to the casing 15, and the carrier C0 is coupled via the low clutch L to the output shaft 13.

Figure 8A:
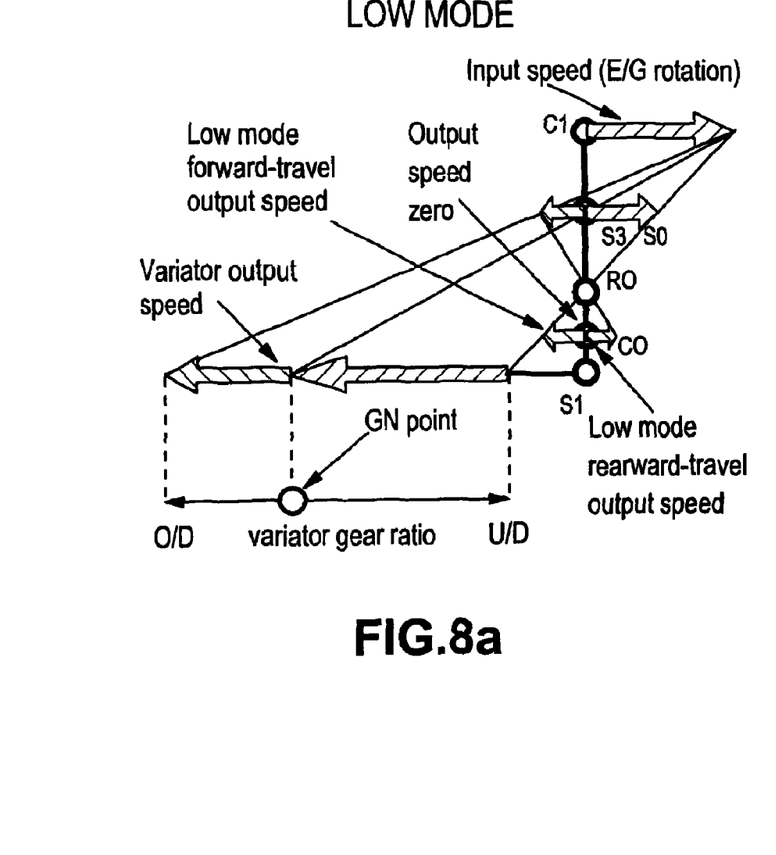
FIG. 8 is a speed diagram showing (a) the low regime and (b) the high mode regime.

The FIG. 7 transmission $1_1$ operates as shown in the speed diagram of FIG. 8. More specifically, as shown in FIG. 8 (a), in the low regime (in which the low clutch L is engaged and the high clutch H is disengaged), rotation of the input shaft 12 (for example engine-output rotation) is transmitted to the carrier C1 of the planetary gear mechanism 6 via a central shaft 12a and is reversed via the toroidal type variator 5 before being transmitted to the first sun gear (input gear) S1. The fixed-speed rotation of the abovementioned carrier C1 and the reversed gear rotation of the input gear S1 are combined while power is recirculated by the planetary gear mechanism 6, and the result is output from the third sun gear (output gear on the low-regime side) S3.

Here, because of the relationship between the input-side gear ratio (S1/P1) and the output-side gear ratio (S3/P3), when the variator 5 is at overdrive (OD) the output gear S3 rotates in the backward direction (taking the direction of rotation of the input shaft 12 to be the forward direction) and the variator 5 changes the gearing from OD to underdrive (UD; speed-decreasing side), and thus it passes through the 0 rotation (GN, geared neutral) point and rotates in the forward direction. When the variator 5 is furthest to the UD side, maximum forward rotation is reached.

The rotation of the said the output gear S3 is transmitted to the input sun gear S0 of the reversing gear mechanism $7_1$, which is integral therewith, and, since the ring gear R0 is locked, rotation is reversed before being output from the carrier C0. The rotation of the said carrier C0 is transmitted via the low clutch L, which is engaged with the output shaft 13. Consequently, the backward rotation of the output gear S3 becomes forward rotation at the carrier C0 and the output shaft 13. However, when the present transmission $1_1$ is used in an automobile, the differential device of the downstream power-transmission side of the transmission $1_1$ has an intervening re-reversing mechanism (not depicted) and the forward rotation of the abovementioned output shaft 13 becomes rotational output for rearward travel of the vehicle. This is to say, as the gearing changes in the variator 5 from OD to UD, the output shaft (carrier C0) 13 changes gearing from rearward-travel rotation, through the GN point (zero rotation) and into forward-travel rotation.

Figure 8B:
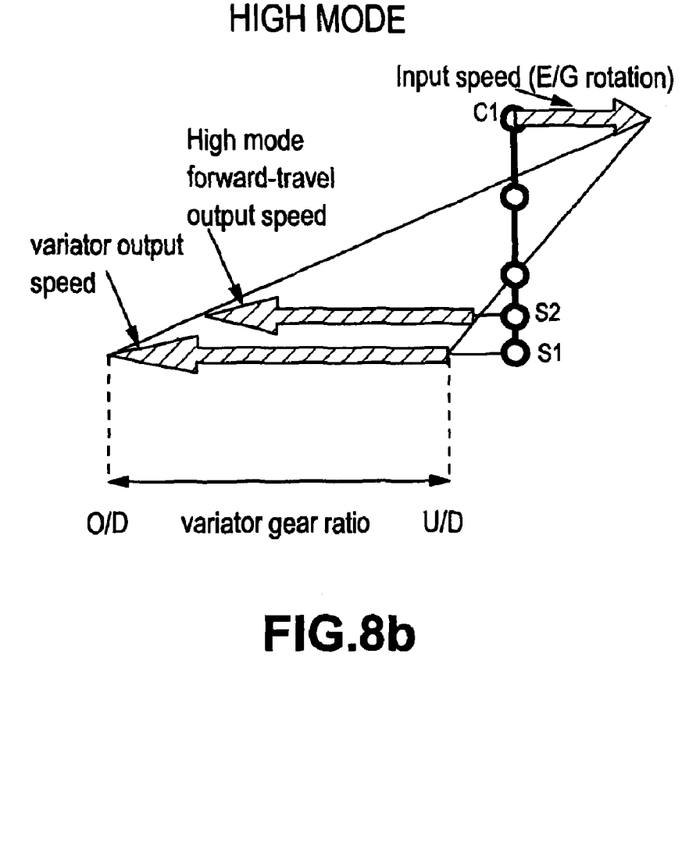

If the low clutch L is disengaged and the high clutch H is engaged, the system changes over to high regime. In this state, the rotation of the second sun gear (the high-mode output gear) S2 of the planetary gear mechanism 6 is output without any alteration, via the high clutch H, to the output shaft 13. As shown in FIG. 8 (*b*), the rotation of the input shaft 12 is directly transmitted to the carrier C1 of the planetary gear mechanism 6, and is reversed by the variator 5 before being transmitted to the first sun gear (input gear) S1.

The fixed-speed forward rotation of the abovementioned carrier C1 and the reversed and geared rotation of the first sun gear S1 are combined by the planetary gear mechanism 6, and the result is output from the second sun gear S2, and, here, the input-side gear ratio (S1/P1) and the output-side gear ratio (S2/P2) are close values or the same value, and the gear ratio of the variator 5 constitutes the output speed after having been shifted in the backward-rotation direction by an amount roughly corresponding to the forward-travel output speed at the time of maximum UD of the variator in the abovementioned low mode. This is to say, when the variator 5 is in the maximum UD state, the second sun gear (output gear) S2 is at its minimum forward-travel output speed in the high mode, the variator 5 shifts gearing from the UD side to the OD side and, as it does so, the forward-travel output speed increases. It will be appreciated that, in terms of the output for the automobile, the backward rotation side corresponds to the forward-travel direction due to the re-reversing mechanism.

Consequently, in the low mode, when the variator 5 is in the maximum OD state, the present transmission 11 is at the maximum speed for rearward travel and, as the variator 5 changes gearing in the UD direction, the system passes through the geared neutral (GN) point and enters the forward-travel state, increasing speed in the forward-travel direction until, in the maximum UD position of the variator 5, the maximum output speed for forward travel in the low regime is reached, at which time the system changes over to the high regime whereupon, with the variator 5 in the maximum UD position, the system is at the minimum output speed being roughly the same as the abovementioned maximum output speed in the low regime. In the high mode, as the variator 5 shifts in the OD direction, the forward-travel output speed also increases and, in the maximum OD position of the variator 5, the maximum output speed for forward travel is reached.

By making the variator 5 shift from OD in the UD direction in this way, the transmission 1 is shifted from rearward travel, through geared neutral and into the forward-travel direction and, by shifting the variator 5 from the UD position in the OD direction, it continues further to increase in speed in the forward-travel direction until it reaches the maximum output speed.

The transmission $1_1$ shown in FIG. 7 does allow for shortening in the axial direction through the use of a dual planetary gear in the reversing gear mechanism, but the planetary gear mechanism 6 used for combining the torques is one having 3 pinions in the axial direction (3 step pinion) similarly to the known transmission 1 shown in FIG. 6.

Figure 9:
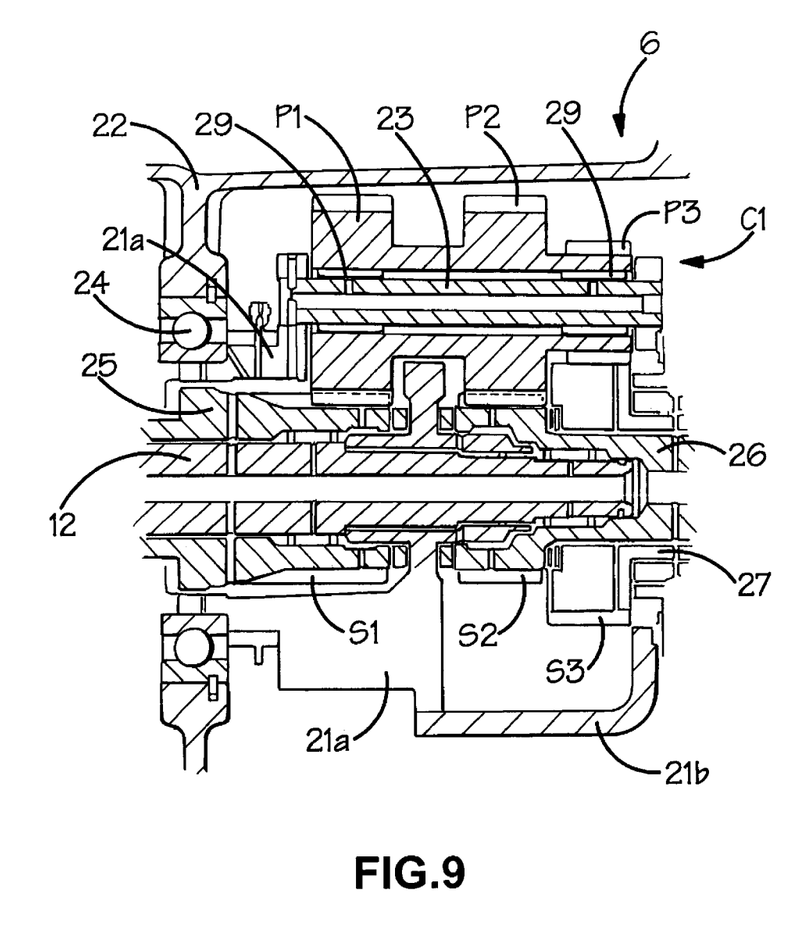
FIG. 9 is a cross-section showing the arrangement of the main parts of the abovementioned background technology.

FIG. 9 shows a section through the type of transmission schematically represented in FIG. 7, having a carrier C1 supporting, linearly in the axial direction, three pinions P1, P2 and P3; a first sun gear (input gear) S1 meshing with the first pinion P1; a second sun gear (high-mode output gear) S2 meshing with the second pinion P2; and a third sun gear (low-mode output gear) S3 meshing with the third pinion P3. The carrier C1 has a carrier main-body 21*a* integrally formed with one of the discs 2 of the variator 5, and a carrier cover 21*b* integral with the said main-body. The carrier main-body 21*a* is supported, with freedom of rotation via a bearing 24, on a transmission casing 22. Further, the said carrier main-body 21*a* and cover 21*b* are provided with a pinion shaft 23 which supports, with freedom of rotation via needle bearings 29 or a bush, the abovementioned integrally formed first, second and third pinions P1, P2 and P3. It will be appreciated that references to a bearing also include a bush.

The first sun gear S1 is formed at the front-end part of a hollow shaft 25, and the base part of the said hollow shaft 25 is coupled to the central output disc 3 (see FIG. 7) of the abovementioned variator 5. In the hollow part of the said hollow shaft 25, an input shaft (central shaft) 12 is supported with freedom of rotation by means of needle bearings or the like, and the said input shaft 12 is coupled to an engine output shaft via a damper as its base part (towards the front of the vehicle), and is spline-connected with the abovementioned carrier main-body 21*a* at its front-end part (towards the back of the vehicle). The second sun gear S2 is formed on an intermediate shaft 26, and the said intermediate shaft 26 is coupled to the high clutch H of the abovementioned low/high regime change mechanism (see FIG. 7). The third sun gear S3 is formed on a sleeve 27 fitted with freedom of rotation over the abovementioned intermediate shaft 26, and the said sleeve 27 is coupled to the sun gear S0 (see FIG. 7) of the abovementioned reversing gear mechanism.

Because the abovementioned pinion shaft 23 supports the three pinions P1, P2 and P3 formed integrally and linearly in the axial direction, it entails an arrangement which is long in the axial direction and, as described hereinabove, since gear shifting continues with both the forward-travel maximum output speed in low mode and the forward-travel minimum output speed in high mode roughly coincident at the maximum UD of the variator 5, the gear diameter of the third pinion gear P3 is reduced and thus the diameter of the pinion shaft 23 is also small.

As a result, since the diameter of the bearing 29 is also small and the life capacity of the bearing 29 is reduced, and the pinion shaft 23 has a reduced diameter, there is a risk that the precision and the life of the carrier C1 will be inadequate in conjunction with increased loading on the bearing as a result of shaft flexing due to insufficient rigidity of the shaft.

Also, the arrangement of the planetary gear mechanism 6 is disadvantageous in terms of loadings such as centrifugal loading, in that the three integrally formed pinions P1, P2 and P3 are heavy and the cagier C1 experiences substantial centrifugal loading.

Further, since the three pinions P1, P2 and P3 are disposed next to each other linearly in the axial direction, the planetary gear mechanism 6 is long in the axial direction and, even if an attempt is made to shorten the reversing gear mechanism, the transmission per se remains long in the axial direction.

It should be noted that the transmission shown in FIG. 7 and FIG. 9 had not been disclosed at the priority date of the present invention.

Figure 1:
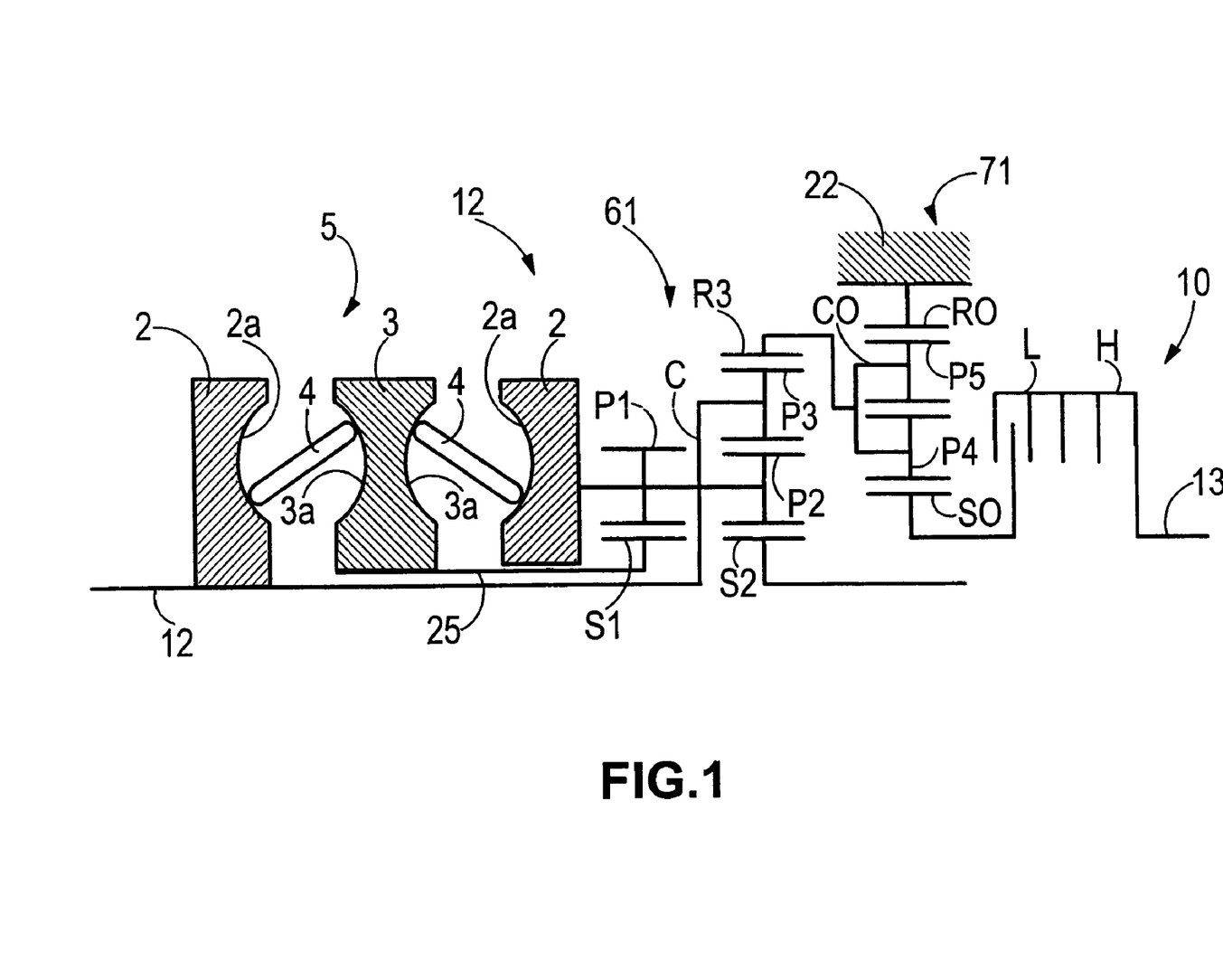
FIG. 1 is a schematic diagram showing the configuration of a continuously variable transmission according to the present invention.

FIG. 1 shows a transmission $1_2$ embodying the present invention. It comprises a continuously variable device ("variator") 5, a planetary gear mechanism $6_1$, a reversing gear mechanism $7_1$ and a low/high change-over mechanism 10. The variator 5 is a toroidal-race, rolling-traction device which has two input discs 2 and 2 coupled to an input shaft 12, a single output disc 3 coupled to a hollow shaft 25 and power rollers 4 and 4 held sandwiched between the two discs. The input discs 2 and the output disc 3 have concave hollows 2a and 3a in the shape of arcs forming part of a circle in such a way that they face each other to form a double cavity sandwiching the two trains of power rollers 4 and 4. Thus they constitute an arrangement whereby the thrust forces of the input discs cancel each other out. The power rollers 4 and 4 can continuously change gear by being made to incline by being shifted in the directions perpendicular to their axes, so altering their radius of contact with the input discs 2 and the output disc 3. The present variator 5 has a speed ratio (output speed/input speed) of from −0.4 to −2.5. It will be appreciated that the speed ratio is "−" (negative) since the output disc 3 turns in reverse relative to the input discs 2.

The planetary gear mechanism $6_1$ comprises a 2-train/4-element type of planetary gear having 2 axially displaced trains of planetary gears and 4 external coupling elements. It preferably comprises a Ravigneaux type of planetary gear having a single simple planetary gear and a single dual planetary gear. The said planetary gear mechanism $6_1$ has a carrier (first element) C supporting a long pinion shaft and a short pinion shaft, and it supports two pinions P1 and P2 in series in the axial direction with freedom of rotation on the long pinion shaft, and supports a single pinion P3 with freedom of rotation on the short pinion shaft. The said carrier C is coupled to the input shaft 12 and is also coupled to one of the output discs 2, and the said carrier C is coupled to the input shaft 12 and to the output disc 2 integral therewith such that fixed-speed rotation is transmitted.

A first sun gear (second element) S1, which is coupled to the output disc 3 of the variator 5, meshes with the first pinion P1, and the said first sun gear S1 constitutes an input gear for inputting geared rotation from the variator 5. The second pinion P2 and the third pinion P3 mesh with each other and are disposed in the same plane (overlapping with each other in the axial direction), and the second pinion P2 meshes with a second sun gear S2 while the third pinion P3 meshes with a ring gear R3. The second sun gear (fourth element) S2 is coupled, via the high clutch H of the low/high regime change mechanism 10, to an output shaft 13 so as to constitute a high-mode output gear. The ring gear (third element) R3 is coupled to a carrier C0 of the reversing gear mechanism $7_1$ so as to constitute a low-mode output gear.

It will be appreciated that an arrangement may alternatively be adopted in which the third pinion P3 meshes with the first pinion P1, and the dual planetary gear is disposed on the side with the sun gear S1 (toward the variator).

The reversing gear mechanism $7_1$ comprises a dual planetary gear having two pinions (a first pinion P4 and a second pinion P5) which mesh with each other, and the carrier C0 thereof is coupled to the ring gear R3 as described hereinabove, while a ring gear R0 is fixed to a casing 22, and a sum gear S0 is coupled via a roller clutch L to the output shaft 13.

The present continuously variable transmission (CVT) 12 operates in the way shown by the gearing diagram of FIG. 2. It will be appreciated that, although the speed diagram of FIG. 2 shows the first and the second pinions P1 and P2 as being a common long pinion, the gear ratios S1/P1 and S2/P2 as being the same, and the output speed and the variator output line as overlapping, it goes without saying that the abovementioned gear ratios (S1/P1) and (S2/P2) may be changed such that the output speed and the variator output line do not overlap as shown in the speed diagram shown in FIG. 8. It will also be appreciated that torque can be distributed at a gear ratio which is better for transmission efficiency as compared with the variator and that the efficiency of the transmission as a whole can be improved by changing the gear ratios S1/P1 and S2/P2. Further, in cases where the abovementioned gear ratios are the same, fuel consumption in the high-speed operating region can be improved by increasing the speed of the output gear S2 in the high mode, and using more highly geared ratios in the transmission as a whole.

Figure 2A:
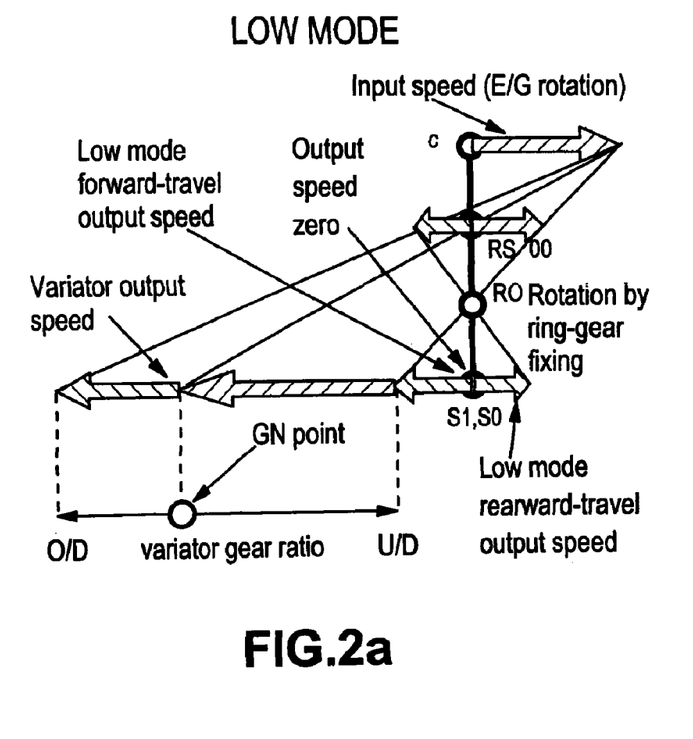
FIG. 2 is a speed diagram showing (a) the low regime and (b) the high regime.

As shown in FIG. 2 (a), in the low regime (in which the low clutch L is engaged and the high clutch H is disengaged), rotation of the input shaft 12 coupled to the engine-output shaft is directly transmitted to the carrier C of the planetary gear mechanism $6_1$, and geared rotation resulting after reversal via the variator 5 is transmitted to the first sun gear (input gear) S1. The fixed-speed rotation of the abovementioned carrier C and the geared rotation (variator gear ratio) of the first sun gear S1 are combined, with power recirculation, by the planetary gear mechanism $6_1$, and the result is output to the ring gear R3 which is the low-regime output gear. It will be appreciated that, at this time, the second sun gear R2 rotates idly since the high clutch H is disengaged. Here, as the variator 5 changes gear from the OD side to the UD side, the output ring gear R3 goes from reverse rotation to the geared neutral position (GN point) which is to say the position in which the output speed is 0 and torque is limitlessly dissipated, and, upon further changing gear to the OD side, it increases in speed to the positive rotation side (the same direction as rotation of the input shaft).

Also, the rotation of the said output ring gear R3 is directly transmitted to the carrier C0 of the reversing gear mechanism $7_1$, and is reversed due to the stopping of the ring gear RD and output from the sun gear S0. In this way the rotations of the abovementioned output ring gear R3 and the carrier C0 are reversed, and backward rotation of the output ring gear R3 is output as rear-ward-travel output speed at the sun gear S0, while positive rotation of the output ring gear R3 is output as forward-travel output speed at the sun gear S0.

Figure 2B:
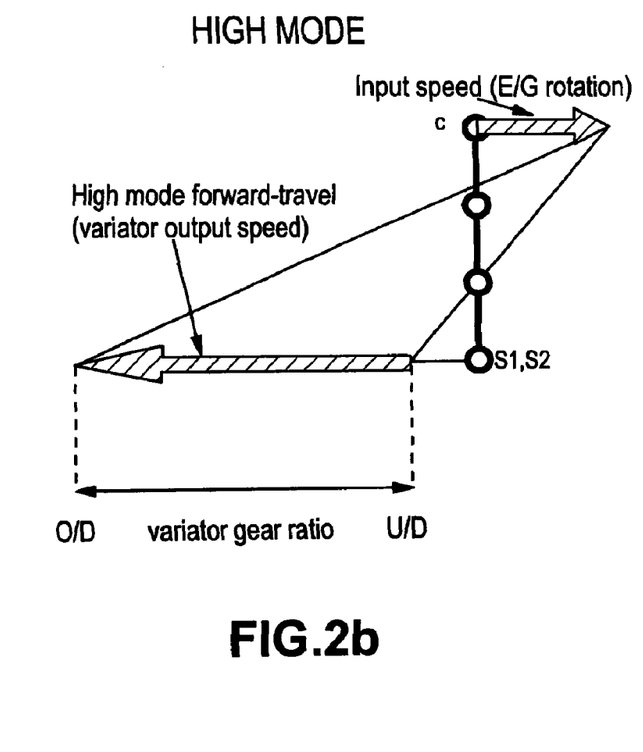

If the low clutch L is disengaged and the high clutch H is engaged, the system switches to high regime. In this state, rotation of the input shaft 12 is directly transmitted to the carrier C of the planetary gear mechanism $6_1$, while the geared rotation resulting after reversal by the variator 5 is transmitted to the first sun gear S1, and these are combined by the said planetary gear mechanism $6_1$. The result is output from the second sun gear S2 which is the high regime output gear. It will be appreciated that, at this time, the sun gear S0 and the carrier C0 of the reversing gear mechanism $7_1$ rotate idly since the low clutch L is disengaged, and thus the ring gear R3 of the planetary gear mechanism $6_1$ also rotates idly. Furthers because the gear ratios S1/P1 and S2/P2 are the same, the abovementioned second sun gear S2 outputs rotation which is the same as the geared output rotation (variatior gear ratio) from the variator 5, and the said variator gear ratio is output as a high regime forward-travel output speed from the output shaft 13 due to the connection of the high clutch H.

Figure 3:
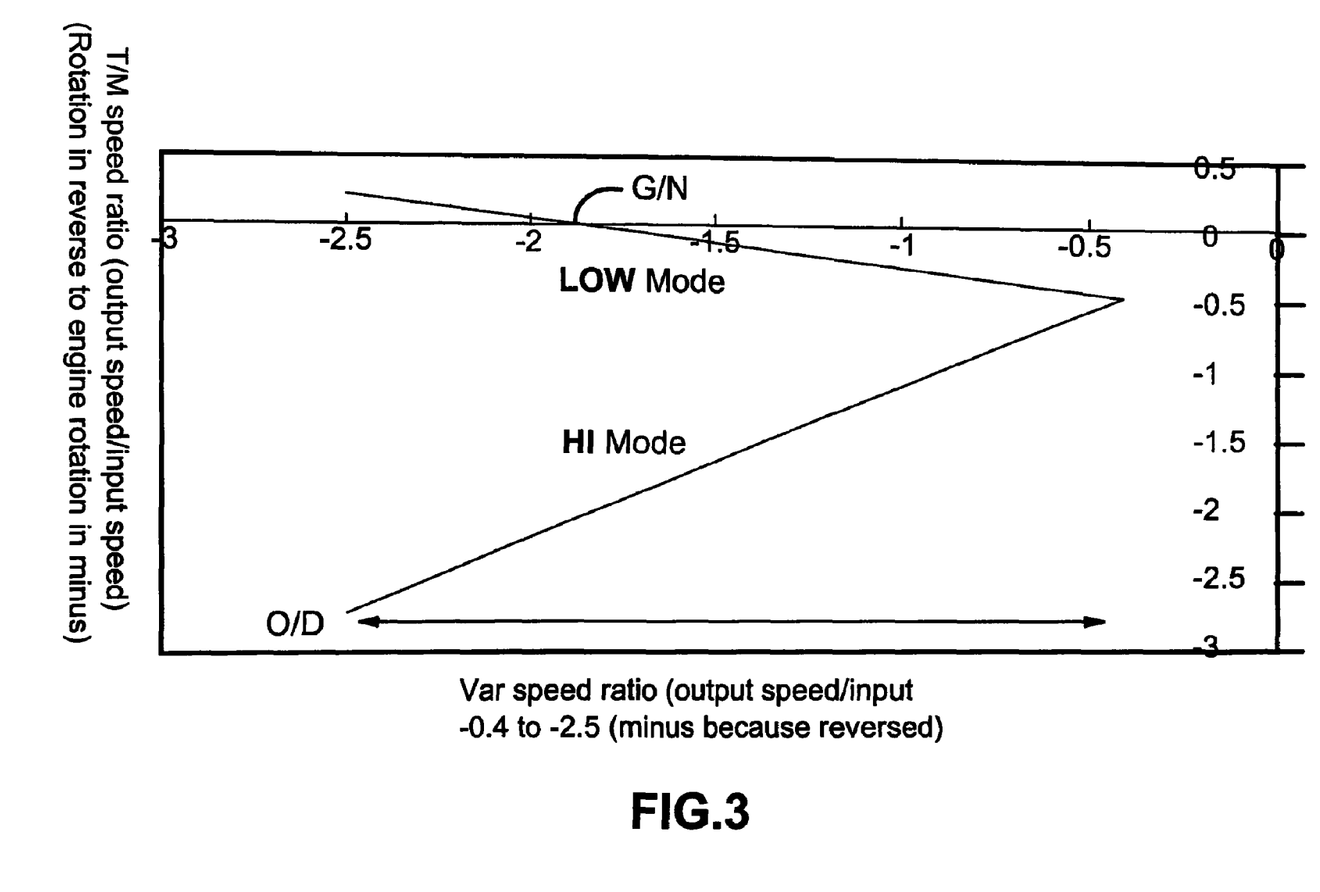
FIG. 3 is a graph showing the relationship between the speed ratio of the variator and the speed ratio of the transmission.

To describe the foregoing with reference to the graph in FIG. 3, in the low regime, when the speed ratio (output speed/input speed) of the variator 5 is at the OD end (about −2.5), the continuously variable transmission (IVT) $1_2$ rotates at a predetermined speed ratio (about 0.25) in the positive-rotation direction, and, as the variator 5 changes gear continuously to the UD side, the speed ratio of the abovementioned continuously variable transmission 12, continuously decreases, and the speed ratio of the continuously variable transmission $1_2$ at a speed ratio close to −1.8 in the variator 5 is zero, which is the geared neutral (GN point). Also, as the variator 5 continues to change gear in the UD direction, the speed ratio of the continuously variable transmission 12 continues to increase in the backward-rotation direction and, when the variator 5 reaches the UD end (about −0.4), the speed ratio of the continuously variable transmission $1_2$ is about −0.5.

Now, in this state, the system changes over to the high regime. In the high regime, when the speed ratio of the variator 5 is at the abovementioned UD end, the speed ratio of the continuously variable transmission 12 is at a value (about −0.5) which is the same as in the abovementioned low mode, and here, if the speed ratio of the variator 5 is changed from the abovementioned UD end continuously in the OD direction, then the speed ratio of the continuously variable transmission $1_2$ increases from the abovementioned low regime continuously in the backward-rotation direction. As regards the said speed increase in the backward-rotation direction, when, continuing on from changing the gearing of the variator 5 in the OD direction, the speed ratio of the variator 5 reaches the OD end (about −2.5), the speed ratio of the continuously variable transmission $1_2$ is about −2.75 which is the maximum speed ratio.

It will be appreciated that, in the abovementioned graph, the direction of rotation of the input shaft 12 (which is to say the direction of rotation of the engine) was taken as constituting positive rotation and the speed ratio was expressed as "plus" and, consequently, the speed ratio of the variator 5 is "minus" since it rotates in reverse due to its toroidal format. Because the present continuously variable transmission (CVT) $1_2$ is used in automobiles and the rotation is reversed again due to a reversing gear in the differential device, it follows that when the speed ratio of the transmission $1_2$ is "plus", the direction of travel of the vehicle is rearward while, when the said speed ratio is "minus", the direction of travel of the vehicle is forward. Consequently, in the low regime, the gearing of the variator 5 can be changed from the OD end to the UD direction such that the speed of the automobile gradually increases as it goes from rearward travel, through geared neutral (GN) and into forward travel, in addition to which, at the UD end of the variator 5 the system changes over into high regime and the gearing of the variator 5 changes from the UD end to the OD direction such that the speed of the automobile continues to increase in the direction of forward travel.

Figure 4:
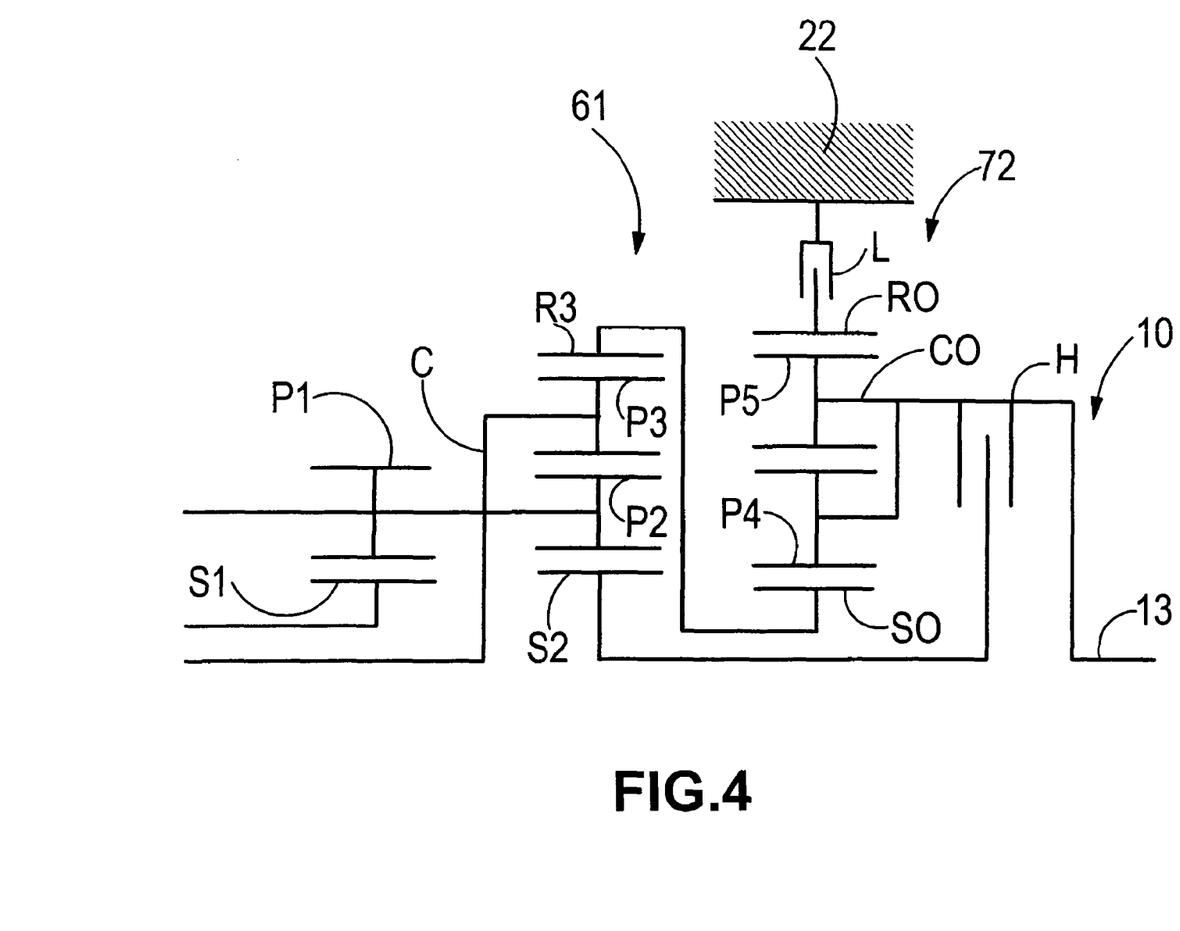
FIG. 4 is a schematic diagram of a partially modified embodiment of the present invention.

FIG. 4 shows a partly modified gear train in which the reversing gear mechanism 72 similarly comprises a dual planetary gear but the ring gear R0 is coupled to a low brake L and the carrier C0 is directly coupled to the output shaft 13. Also the low regime output ring gear R3 of the planetary gear mechanism $6_1$ is coupled to the sun gear S0 of the reversing gear mechanism 72, and the high clutch H is interposed between the high regime output gear S0 of the planetary gear and the output shaft 13.

The manner of operation of this embodiment is the same as that described with reference to FIG. 2 except that the location which is the same as the low regime output ring gear R3 in FIG. 2(a) is the sun gear S0. More specifically, in the low regime, rotation of the output ring gear R3 is input to the sun gear S0 of the reversing gear mechanism $7_2$ and is reversed by fixing the ring gear R0 by engaging the low brake L, and is output from the carrier C0 to the output shaft 13. It goes without saying that, in the said reversing gear mechanisms $7_1$ and $7_2$, the input and output forces may involve either the sun gear S0 or the carrier C0.

Figure 5:
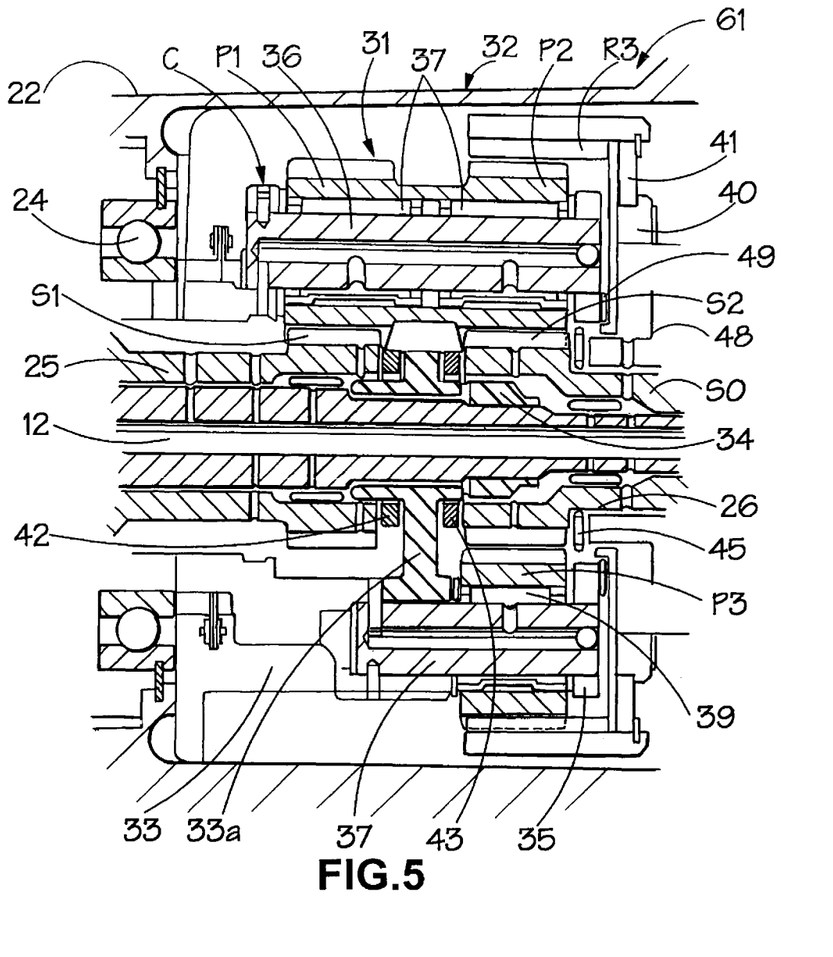
FIG. 5 is a cross-section showing the main parts of an embodiment of the present invention.

FIG. 5 is a cross-sectional diagram showing a planetary gear according to the present invention. The planetary gear mechanism $6_1$ is of Ravigneaux type, comprising 2 trains consisting of a simple planetary gear 31 and a dual planetary gear 32. The said planetary gear mechanism 61 has a carrier C supporting a first pinion P1, a second pinion P2 and a third pinion P3; a first sun gear (input gear) S1 meshing with the first pinion P1; a second sun gear (high-mode output gear) S2 meshing with the second pinion P2; and a low-mode output ring gear R3 meshing with the third pinion P3. The carrier C comprises a carrier main-body 33 and a carrier cover 35 integrally connected with the said main-body, and the carrier main-body 33 is supported with freedom to rotate via a bearing 24 on a transmission casing 22, and is also coupled to one of the output discs 2 of the variator 5, in addition to which it is spline-connected and fastened by a nut 34 to the input shaft 12 which extends through the centre of the variator 5.

A first pinion shaft 36 which is shared by both the abovementioned simple and dual planetary gears 31 and 32, and a second shorter pinion shaft 37 used by the dual pinion 32 are provided, and are prevented from revolving, across the abovementioned carrier main body 33 and carrier cover 35. The first pinion P1 and the second pinion P2 are supported next to each other in the axial direction on the first pinion shaft 36, while the third pinion P3 is supported on the second pinion shaft 37. The first pinion P1 and the second pinion P2 are integrally formed, and, although they need not necessarily have the same number of teeth, in the present embodiment they have the same number of teeth, and the shared pinions P1 and P2 are supported with freedom of rotation on the abovementioned first pinion shaft 36 via needle bearings 37 and 37 (or a bush). The third pinion P3 is supported with freedom of rotation via needle bearings 39 (or a bush) on the abovementioned second pinion shaft 37.

The abovementioned first sun gear S1 is formed on the front-end portion of a hollow shaft 25, and the said hollow shaft 25 is supported with freedom of rotation over the input shaft 12. At its base-end portion it is coupled to the output disc 3 of the variator 5. The second sun gear S2 is formed on the base-end part of an intermediate shaft 26, and the said intermediate shaft 26 is supported with freedom of rotation with its base-end portion fitted over the input shaft 12, while to its front-end (to the rear), it is connected to the high clutch H of the low/high regime change mechanism 10. The output ring gear R3 cannot be pulled off but is fixed, via a ring-shaped splined member 41, on the carrier flange 40 of the reversing gear mechanism $7_1$.

Also, the respective thrust bearings 42 and 43 are interposed between the front and rear side surfaces of the spline-coupled part 33a of the abovementioned carrier main-body 33 and the rear-end surface of the hollow shaft 25 and front-end surface of the intermediate shaft 26, and a thrust bearing 45 is interposed between the rear-end surface of the intermediate shaft 26, in the portion where the second sun gear S2 is formed, and the front end of the sun gear S0 of the reversing gear mechanism $7_1$. In this way, with reference to the hollow shaft 25 having the first sun gear S1 and the intermediate shaft 26 having the second sun gear S2, the thrust forces of the sun gears S1 and S2 produced by the meshing of the respective first and second pinions P1 and P2 cancel each other out, and they are also supported in such a way as to close within the planetary gear mechanism $6_1$ due to the carrier main-body 33 which is integrally joined to the input shaft 12. It will be appreciated that the input shaft 12 and the carrier C which is integral therewith are supported in such a way as to cancel out the substantial thrust forces (sandwiching pressure) between the two discs 2 and 2 produced in the variator 5; and the variator 5 and the planetary gear mechanism $6_1$ have a closed support configuration with respect to the direction of thrust, acting as a single train. It will be appreciated that the thrust bearing 43 may be dispensed with, in which case the thrust force acting on the second sun gear S2 in the direction to the left in the figure acts on the carrier C via the intermediate shaft 25 and a snap ring 48 and the thrust bearing 49, and the thrust force of the first sun gear S1 is cancelled by the said carrier C.

If the abovementioned first pinion shaft 36 supports two pinions P1 and P2, it will comprise a sufficiently short structure (as compared with the step pinion shown in FIG. 7) and the low regime output gear will comprise the ring gear R3 and thus there will be few limitations on gear ratios for achieving the function of the continuously variable transmission $1_2$, and the first pinion shaft 36 can be one with a large axial diameter. Therefore, the bearing 37 can be one which has a large diameter and the life capacity can be improved, in addition to which the rigidity of the first pinion shaft 36 can be improved and load fluctuation on the bearing due to shaft flexing can be reduced, and the pinion weight becomes lighter, centrifugal loading is reduced, and these together can maintain the precision of support of the pinions P1 and P2 over a long period of time.

Further, because the thrust forces acting on the first and second sun gears S1 and S2 meshing with the first and second pinions P1 and P2 are supported with the planetary gear mechanism $6_1$ as a system integral with the variator 5, it follows that there is a reduction in the thrust load on the casing 22 in the continuously variable transmission 12 conjointly with the closed support due to the integral arrangement with the input shaft 12 and the variator input disc 2 of the carrier C.

Further, the planetary gear mechanism $6_1$ can use the ring gear R3 as a low regime output gear such that the low regime and high regime output gears R3 and S2 can overlap in the axial direction and the length in the axial direction can be shortened.

What is claimed is:

1. A continuously variable transmission (CVT) comprising a toroidal-race continuously variable ratio device, a planetary gear mechanism, a reversing gear mechanism, and a low/high regime change mechanism, the toroidal-race continuously variable ratio device having a rotary input and a rotary output, the rotary input of the toroidal-race continuously ratio device being drivably coupled to an input shaft of the CVT, characterised in that:
   the planetary gear mechanism comprises two trains of planetary gears and four external coupling elements, namely a first element, a second element, a third element and a fourth element,
   the first element is drivably coupled to the input shaft so that its rotation is determined by that of the input shaft, and the second element is drivably coupled to the rotary output of the toroidal-race continuously variable ratio device so that its rotation is determined by the toroidal-race continuously variable ratio device's output speed and results from a reversal of the rotational direction of the input shaft of the CVT and a continuously variable speed change produced by the toroidal-race continuously variable ratio device,
   in a low regime mediated by the low/high regime change mechanism, the third element is drivingly coupled to an output shaft of the CVT, the rotation of the third element being reversed by means of the reversing gear mechanism, and
   in a high regime mediated by the low/high regime change mechanism, the fourth element is drivingly coupled to the output shaft of the CVT.

2. A CVT is claimed in claim 1, in which the planetary gear mechanism is of Ravigneaux type.

3. A CVT as claimed in claim 1, wherein the toroidal-race continuously variable ratio device has two input discs, an output disc or a back-to-back pair of output discs positioned between the input discs, and rollers sandwiched between the input discs and output discs, and the two input discs, the input shaft and the carrier of the abovementioned planetary gear mechanism are arranged to collectively sustain thrust forces, and the first and second sun gears are also supported in the thrust direction via thrust bearings, with respect to the integrally arranged carrier or input shaft.

4. A continuously variable transmission (CVT) comprising a toroidal-race continuously variable ratio device, a planetary gear mechanism, a reversing gear mechanism, and a low/high regime change mechanism, characterised in that:
   the planetary gear mechanism has a carrier having a first pinion shaft and a second pinion shaft, a first sun gear, a second sun gear, and a ring gear,
   the first pinion shaft supports a first pinion and a second pinion which rotate together, the second pinion shaft supports a third pinion, and the first pinion or the second pinion meshes with the third pinion,
   the first pinion and the first sun gear mesh, the second pinion and the second sun gear mesh, and the third pinion and the ring gear mesh,
   the carrier receives rotational input from an input shaft, and the first sun gear receives the toroidal-race continuously variable ratio device's output rotation, which results from reversal and speed change of the rotation of the input shaft produced by the toroidal-race continuously variable ratio device,
   in a low regime mediated by the low/high regime change mechanism, the rotation of the abovementioned ring gear is output to an output shaft after having been reversed by means of the reversing gear mechanism, and
   in a high regime mediated by the low/high regime change mechanism, the rotation of the second sun gear is output to the output shaft.

5. A CVT as claimed in claim 4, wherein the reversing gear mechanism comprises a dual planetary gear having a carrier supporting a first and a second pinion which mesh with each other, a sun gear which meshes with the first pinion, and a ring gear which meshes with the abovementioned second pinion, and
   the ring gear of the planetary gear mechanism is coupled to one or other of the carrier and sun gear of the reversing gear mechanism and, in the low regime, with the ring gear stopped, one of the carrier and the sun gear of the reversing gear mechanism transmits the rotation of the other to the output shaft.

* * * * *